United States Patent
Spry et al.

(10) Patent No.: US 7,886,174 B2
(45) Date of Patent: Feb. 8, 2011

(54) MEMORY LINK TRAINING

(75) Inventors: Bryan L. Spry, Portland, OR (US); Christopher P. Mozak, Beaverton, OR (US); Stanley S. Kulick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 11/769,414

(22) Filed: Jun. 27, 2007

(65) Prior Publication Data

US 2009/0006776 A1    Jan. 1, 2009

(51) Int. Cl.
G06F 1/12 (2006.01)
G06F 13/42 (2006.01)
H04L 5/00 (2006.01)
H04L 7/00 (2006.01)

(52) U.S. Cl. ....................................................... 713/400
(58) Field of Classification Search ................. 713/400, 713/401
See application file for complete search history.

(56) References Cited

U.S. PATENT DOCUMENTS

| | | | |
|---|---|---|---|
| 5,717,761 A * | 2/1998 | Yatagai | 380/261 |
| 6,615,345 B1 * | 9/2003 | LaBerge | 713/100 |
| 6,704,881 B1 * | 3/2004 | Li et al. | 713/401 |
| 6,931,560 B1 * | 8/2005 | Porter et al. | 713/400 |
| 6,950,956 B2 * | 9/2005 | Zerbe et al. | 713/400 |
| 7,130,367 B1 * | 10/2006 | Fu et al. | 375/376 |
| 7,412,616 B2 * | 8/2008 | Matsui et al. | 713/401 |
| 7,624,213 B2 * | 11/2009 | Lesartre et al. | 710/104 |
| 2007/0074062 A1 * | 3/2007 | Chang et al. | 713/502 |
| 2008/0285598 A1 * | 11/2008 | Farbarik et al. | 370/516 |

* cited by examiner

*Primary Examiner*—Thomas Lee
*Assistant Examiner*—Mohammed H Rehman
(74) *Attorney, Agent, or Firm*—Derek J. Reynolds

(57) ABSTRACT

An apparatus and method are disclosed. In one embodiment, the apparatus trains a memory link using a signal alignment unit. The signal alignment unit aligns a read data strobe signal that is transmitted on the link with the center of a read data eye transmitted on the link. Next, the signal alignment unit aligns a receive enable signal that is transmitted on the link with the absolute time that data returns the data lines of the link a column address strobe signal is sent to the memory coupled to the link. Next, the signal alignment unit aligns a write data strobe signal transmitted on the link with the link's clock signal. Finally, the signal alignment unit aligns the center of the write data eye transmitted on the link with the write data strobe transmitted on the link.

11 Claims, 2 Drawing Sheets

MEMORY LINK TRAINING

FIELD OF THE INVENTION

The invention relates to training a memory link. More specifically, the invention relates to aligning groups of read and write signals on a memory link.

BACKGROUND OF THE INVENTION

The design window for a modern memory controller has been shrinking significantly due to both the increasing interconnect speed and increasing variation seen in high volume manufacturing of the silicon, package, dual inline memory module (DIMM), and motherboard. Current designs use DLLs (delayed lock loops) to center the address, command and data signals in the middle of the eye and recover some of this lost timing margin. The term "eye" generally refers to the particular characteristic appearance of the data signal waveforms. This has led to an increase in circuit area and complexity to tackle the problem as well as limiting the frequency scaling possible with double data rate (DDR) technology. Currently, some memory controllers test for DLL settings using software controls with a limited number of samples.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of an apparatus and method to train a memory link are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
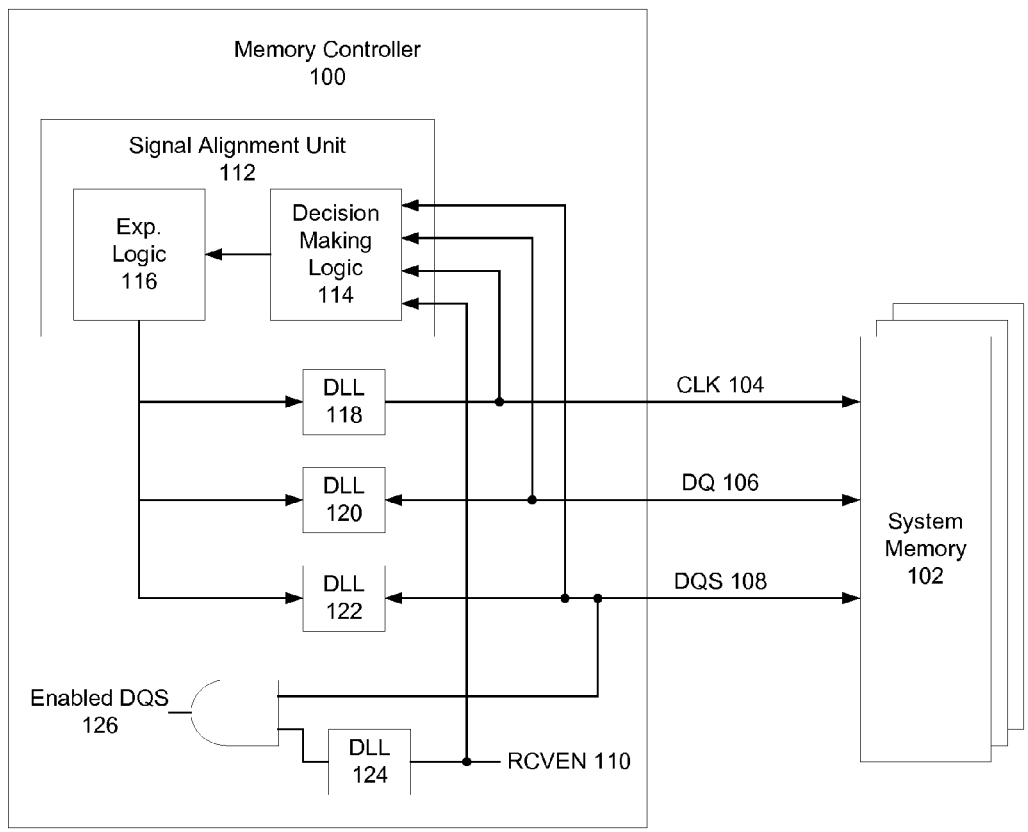
FIG. 1 describes one embodiment of an apparatus capable of training a memory link.

FIG. 1 describes one embodiment of an apparatus capable of training a memory link. "Training" a link (i.e. interconnect) refers to aligning all relevant signals in the link to as close to optimal positions as possible. In many embodiments, a memory controller 100 is coupled to system memory 102 by a link (i.e. an interconnect). The memory controller may be located within any type of computer system including, but not limited to a desktop computer, a server, a laptop, a handheld device, a tablet personal computer, a set-top box, or any other conceivable type of computer system that utilizes system memory. Within the computer system, the memory controller may be located in a chipset, in one or more processors coupled to the chipset, or in a discrete component coupled to the system memory. Additionally, the link may be any type of link capable of transmitting data between two components within a computer system.

The link may include a number of physical lines that each transmit some form of information. In many embodiments, each physical line of the link transmits a binary "1" or binary "0" by transmitting a supply voltage of a certain voltage level, or transmitting a negative voltage or ground.

In many embodiments, the system memory 102 is double data rate 3 (DDR3) synchronous dynamic random access memory (SDRAM). In other embodiments, the system memory 102 may be another type of memory such as graphics DDR (GDDR) memory. In the embodiments using DDR3 memory, a DDR3 link includes a number of specific physical link lines. A line that transmits a source clock (CLK 104) from the memory controller 100 to the system memory 102 is one such physical link line. A number of lines that transmit data (DQ 106) from both the memory controller 100 to system memory 102 and vice versa are also certain physical lines of the link (although the DQ 106 lines are more than one in number, only one line is shown for ease of explanation). Additionally, a line that transmits the data strobe (DQS 108) is included in the link as well. In many embodiments, there are multiple data strobe lines (e.g. one strobe for every 4, 8, 16, etc. data lines). The DQS line(s) are also bi-directional. Other command lines, control lines, and additional lines are present within the link, though they are not shown.

The DDR3 link may contain multiple channels to transmit data between the memory controller 100 and the DDR3 system memory 102. The DDR3 system memory may have one or more dual in line memory modules (DIMMs) that comprise system memory. The DDR3 system memory 102 also may include multiple ranks of memory on each DIMM and multiple banks of memory within each rank.

In many embodiments, a signal alignment unit 112 is located within the memory controller 100. In other embodiments, the signal alignment unit is coupled to the link but in a discrete component not integrated in the memory controller (the discrete embodiments are not shown). The signal alignment unit 112 contains logic to train the DDR3 link. Training the DDR3 link includes aligning a number of the different signals in the link to optimal locations relative to one or more other signals in the link. In many embodiments, the alignment of all lines of a certain signal is done in parallel (e.g. all DQ lines are aligned in parallel, all DQS lines are aligned in parallel, etc).

The signal alignment unit 112 includes some decision making logic 114 that has, as input, the current alignments of each of the multiple signals in need of alignment on the link. This logic decides whether a particular signal that is currently being aligned has met its alignment goals, or is in need of further alignment. If further alignment is needed, this decision is fed into experimentation logic 116 with specific data on adjusting the signal being aligned further. The experimentation logic receives this data and then modifies one or more delayed lock loops (DLLs) that are "pairingly" coupled to the link lines (DLLs 118-124 are coupled to link lines 104-110 respectively). "Pairingly" coupled refers to one DLL being coupled to one line as a pair. The DLL coupled to the line transmitting the signal being aligned has it's delay changed to increase or decrease the delay of the particular signal being transmitted. The particular steps to train the signals in the link are described in FIG. 2.

Figure 2:
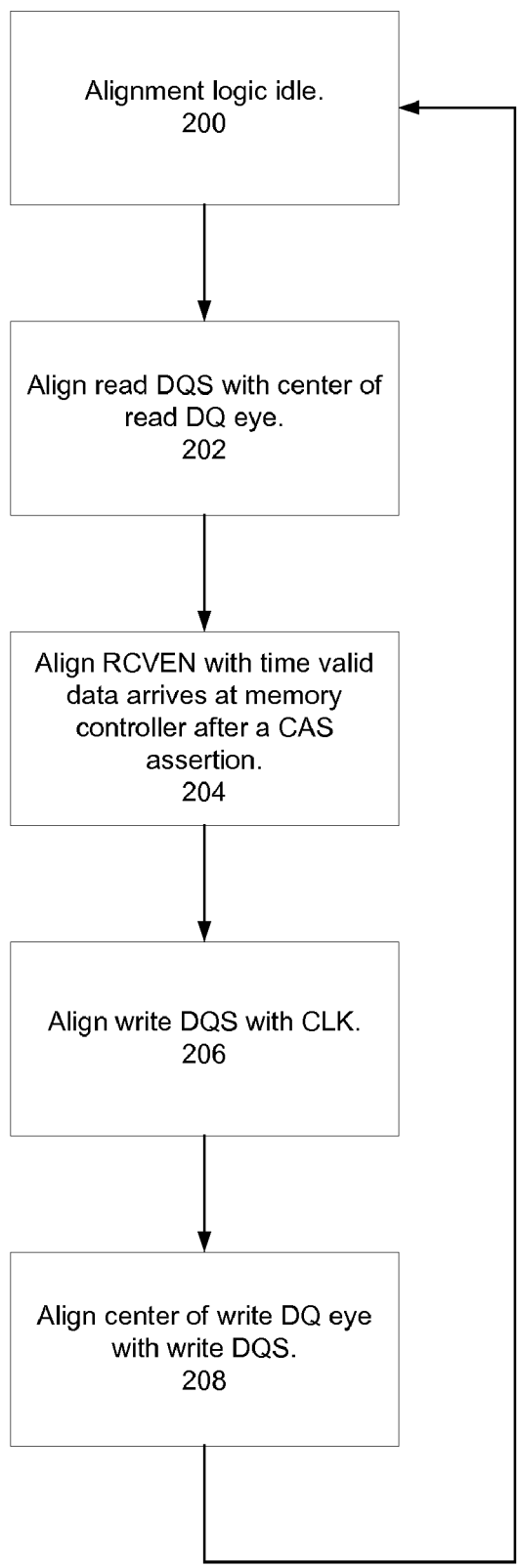
FIG. 2 describes one embodiment of a finite state machine (FSM) flow diagram to train a memory link.

Thus, FIG. 2 describes one embodiment of a finite state machine (FSM) flow diagram to train a memory link. In many embodiments, the alignment FSM begins in a quiescent state where the alignment logic is idle (block 200). In some embodiments, this could be due to the fact that the computer system that the alignment logic is in was powered down. When the system powers up, the system memory is initialized and during initialization is when system memory alignment usually takes place. Thus, once the system memory begins initialization, the FSM leaves the idle state and begins by aligning the receive group of signals. In many embodiments, a signal transmitted on the link is aligned relative to another signal on the link. The other signal per alignment can be referred to as the reference signal for that particular alignment because it is stationary, while the signal being aligned has its delay increased or decreased relative to the reference signal. There are two groups of signals that require alignment for full DDR3 system memory training. The receive group of signals are the signals that require alignment for the memory controller to receive valid data from the DDR3 memory. The transmit group of signals are the signals that require alignment for the memory controller to transmit valid data to the DDR3 memory.

First, the signal alignment unit aligns the read data strobe (DQS) with the center of the read data (DQ) eye (block 202). The term "data eye" generally refers to the valid sampling window of the DQ lines. A "read" data eye refers to valid sampling window for data (DQ) when the system memory is driving the DQ lines for the memory controller to read data from memory. The optimal alignment of the read DQS strobe against the read DQ data eye is to place the DQS strobe in the center of the eye. The placement of the strobe in the center of the eye refers to placing the assertion or deassertion of the strobe (from logical zero to one or from logical one to zero) in the middle of the eye.

To perform this alignment, the signal alignment unit reads a known test pattern from system memory a number of times. The signal alignment units averages the results of many reads and adjust the delay of the DLL coupled to the DQS line. The signal alignment unit adjusts the delay in one direction until the test pattern is no longer valid and deems that delay to be one edge of the eye. Then the signal alignment unit adjusts the delay in the opposite direction until the test pattern again is no longer valid and deems that to be the other edge of the eye. Finally, the signal alignment unit can average the high delay and low delay to get the average delay, which is the center of the eye.

Second, the signal alignment unit (112 in FIG. 1) aligns a receive enable signal (RCVEN 110) with a particular absolute time (potentially measured relatively against the CLK signal) that valid data arrives at the memory controller from system memory after a read column address strobe (CAS) assertion by the memory controller to system memory (block 204). RCVEN 110 is a signal internal to the memory controller. It is triggered after a calculated delay from the read CAS being sent out to system memory. The RCVEN 110 internal signal acts as an enable so the memory controller can sample the data strobes. This prevents sampling bad strobes or strobes that were actually being driven for a write. Thus, the assertion of the RCVEN 110 signal notifies the memory controller that it can look at the data strobe and expect that there will be valid data on the DQ lines to be read. The RCVEN 110 signal is aligned, using DLL 124, by adjusting its location until it is in the center of the read DQS preamble that occurs at the beginning of data transmission.

In many embodiments, the RCVEN 110 signal is ANDed (through an AND gate) with the read DQS signal to create an "enabled" read DQS signal 126. This prevents the memory controller from reading at the wrong time and bringing invalid data into a read buffer in memory. In some embodiments, the RCVEN 110 signal is also used as a clock for sampling the DQS signal as feedback to the signal alignment unit.

Next, the signal alignment unit aligns the write DQS signal with the CLK signal (block 206). This alignment is referred to as write leveling. Write leveling utilizes a flop-based phase detector mechanism within DDR3 system memory to tell if the write DQS is leading or lagging the CLK as the two signals reach the system memory after they have been transmitted across the link. DDR3 system memory provides this information as feedback to the memory controller and the signal alignment unit takes this information to adjust the delay of the DQS utilizing the DLL coupled to the DQS line. Once the DDR3 system memory returns feedback that confirms the write DQS is aligned with the CLK, then the signal alignment unit advances to the last of the alignment blocks in the FSM.

Thus, finally, the signal alignment unit aligns the center of the write DQ eye with the write DQS (block 208). This alignment is similar to the read version in block 204 except for two major differences. First, since this is write alignment, the memory controller is driving the DQ and DQS signals. Second, the adjustment for the write DQ-DQS changes the delay of the DQ signals, not the DQS signal. Thus, the signal alignment unit finds the center of the write DQ eye similarly as it found the center of the read DQ eye, but then the signal alignment unit adjusts the delay of the write DQ eye relative to the DQS strobe. Thus, the DQS stays at the same delay setting that it was set at during the write leveling alignment in block 206 and the write DQ eye is then adjusted to match it's center with the DQS. The write DQ/DQS alignment utilizes one or more test patterns that the memory controller writes out to one or more locations in memory and then reads back to determine if the write was successful. Once all of these steps are complete, the link is trained (i.e. the signals are aligned).

Read CAS commands are utilized for all training but the write leveling (blocks 202, 204, and 208). This is because the assertion of a read CAS will provide data on the DQ lines after a certain time for the signal alignment unit to read and check the test pattern. Similarly write CAS commands are used for the write group of trainings (blocks 206 and 208). This training order is important because each step provides information utilized by following steps. For example, reads must be functional before they can be used to verify success or failure during write training.

In many embodiments, one or more of the training blocks shown can be done dynamically after the system has booted. For example, if a system event takes place such as the frequency of the system changes, the voltage level changes, or the ambient temperature around the system changes, which creates a change in the timing accuracy of memory, the system may go through a retraining process dynamically to re-center and re-align one or more of the signals during system operation.

The signal alignment unit may include an alignment timeout timer in some embodiments. This timer may be utilized by the signal alignment unit during each alignment block so that if an alignment continues to fail for some reason at a given block, the signal alignment unit can timeout of that alignment block and either stop and generate an error, or continue on to the next alignment block without success at the previous alignment block. In many embodiments, the signal alignment unit also includes an error register that sets error flags for each alignment block that fails. To minimize the impact of DIMM variations as well as variations in the motherboards that the memory controller and system memory are coupled to, the aligning actions described above are performed for each memory rank separately.

In many embodiments, a mask register is located within the memory controller that allows for basic input/output system (BIOS) modifications to the alignment blocks. With BIOS interaction, the alignment blocks can be turned and off individually to allow for user modification of each step of the training. For example, the training for the read group of signals could be turned on and the training for the write group of signals could be turned off. Commands and configuration for controlling the FSM may be defined in one or more configuration registers within the memory controller or elsewhere within the computer system to allow BIOS to sequence the training. In many embodiments, the FSM blocks may be executed one block at a time (single step) in physical layer of the memory controller. This single step methodology allows firmware within the computer system to have a much finer control of the physical layer training FSM.

Additionally, in many embodiments, the signal alignment unit stores an alignment complete flag. This flag may be set once the full set of alignment blocks have been completed by the FSM and the link is trained.

Thus, embodiments of an apparatus and method to train a memory link are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. An apparatus to train a memory link, comprising:
    a signal alignment unit, coupled to a plurality of signal lines of the link, operable to
        align a read data strobe signal of the link on a center of a read data eye of the link;
        align a receive enable signal of the link with a time that data returns on one or more data lines of the link after a column address strobe signal is sent to a memory coupled to the link;
        align a write data strobe signal of the link with a clock signal of the link; and
        align a center of a write data eye of the link with a write data strobe of the Link;
    an alignment timeout timer to time out of one or more of the align operations if one or more of the align operations takes longer than a predetermined maximum time designated for an align operation; and
    an alignment error register to store one or more alignment error flags, each alignment error flag being designated to report an alignment error for one of the one or more align operations, wherein an alignment error flag is set if the time spent on its designated align operation exceeds the predetermined maximum time.

2. The apparatus of claim 1, wherein the signal alignment unit further comprises a plurality of delay locked loops, each one of the plurality of delay locked loops being pairingly coupled to one of the plurality of signal lines.

3. The apparatus of claim 2, wherein the signal alignment unit is further operable to
    select a reference signal line; and
    shift a first signal phase transmitted on a first signal line of the plurality of signal lines, utilizing the delay locked loop pairingly coupled to the first signal line, relative to a phase of a reference signal transmitted on the reference signal line to align the first signal phase with the reference signal phase.

4. The apparatus of claim 1, wherein the signal alignment unit is further operable to align the receive enable signal, the read data strobe signal, the write data strobe signal, and the center of the write data eye for each of a plurality of ranks in the memory.

5. The apparatus of claim 1, wherein the signal alignment unit further comprises an alignment complete flag, wherein the signal alignment unit sets the alignment complete flag when all signal alignment operations are complete and no error flags are set in the alignment error register.

6. The apparatus of claim 1, wherein the signal alignment unit performs one or more of the signal alignments in response to a setting in a basic input/output system (BIOS) to align a signal.

7. The apparatus of claim 1, wherein the signal alignment unit performs one or more of the signal alignments dynamically in response to a system event.

8. A method of training a memory link, comprising:
    aligning a read data strobe signal of the link on a center of a read data eye of the link;
    aligning a receive enable signal of the link, the link being comprised of a plurality of signal lines, with a time that data returns on one or more data lines of the link after a column address strobe signal is sent to a memory coupled to the link;
    aligning a write data strobe signal of the link with a clock signal of the link;
    aligning a center of a write data eye of the link with a write data strobe of the link;
    timing out of one or more of the align operations if one or more of the align operations takes longer than a predetermined maximum time designated for an align operation; and
    storing one or more alignment error flags, each alignment error flag being designated to report an alignment error for one of the one or more align operations, wherein an alignment error flag is set if the time spent on its designated align operation exceeds the predetermined maximum time.

9. The method of claim 8, further comprising:
    selecting a reference signal line; and
    shifting a first signal phase transmitted on a first signal line of the plurality of signal lines relative to a phase of a reference signal transmitted on the reference signal line to align the first signal phase with the reference signal phase.

10. The method of claim 8, further comprising:
    aligning the receive enable signal, the read data strobe signal, the write data strobe signal, and the center of the write data eye for each of a plurality of ranks in the memory.

11. The method of claim 8, further comprising setting an alignment complete flag when all signal alignment operations are complete and no error flags are set in the alignment error register.

* * * * *